United States Patent [19]

Gonder

[11] 4,214,572
[45] Jul. 29, 1980

[54] COLLECTION OF SOLAR ENERGY

[76] Inventor: Warren W. Gonder, 298 Space View Dr., Grants Pass, Oreg. 97526

[21] Appl. No.: 924,210

[22] Filed: Jul. 12, 1978

[51] Int. Cl.² ............................ F24J 3/02; F03G 7/02
[52] U.S. Cl. .................................... 126/425; 60/641; 126/415; 126/438
[58] Field of Search ............... 126/270, 271, 450, 425, 126/438, 451, 415; 237/1A; 60/641

[56] References Cited

U.S. PATENT DOCUMENTS

| 3,713,727 | 1/1973 | Markosian | 126/271 |
|---|---|---|---|
| 3,847,136 | 11/1974 | Salvail | 126/271 |
| 3,998,206 | 12/1976 | Jahn | 126/271 |
| 4,002,032 | 1/1977 | Bash | 126/271 |
| 4,026,273 | 5/1977 | Parker | 126/271 |
| 4,111,184 | 9/1978 | Fletcher | 126/270 |
| 4,136,674 | 1/1979 | Korr | 126/271 |
| 4,148,301 | 4/1979 | Cluff | 126/271 |
| 4,149,523 | 4/1979 | Boy-Marcotte et al. | 126/271 |
| 4,153,039 | 5/1979 | Carroll | 126/271 |
| 4,159,629 | 7/1979 | Korr | 60/641 |

Primary Examiner—James C. Yeung
Assistant Examiner—Daniel J. O'Connor

[57] ABSTRACT

Apparatus for collecting solar energy comprises one or more solar energy collectors attached to a frame which floats on a pool of water, and means for orienting the frame relative to the azimuthal direction of the sum. The solar energy collectors are preferably horizontal elongate parabolic reflectors which also float on the pool of water and which can be rotated about their longitudinal axes to orient them relative to the elevation of the sun. Solar rays reflected by such reflectors are absorbed by elongate absorption devices placed at the focal points of the parabolic reflectors. The absorption devices are preferably of a novel design which provides for removal of the energy of the absorbed rays by means of a working fluid which passes through the device. The parabolic reflectors preferably have body portions composed of a novel constructional material which comprises a plurality of hollow glass bodies which are connected together through randomly coalesced wall portions.

11 Claims, 7 Drawing Figures

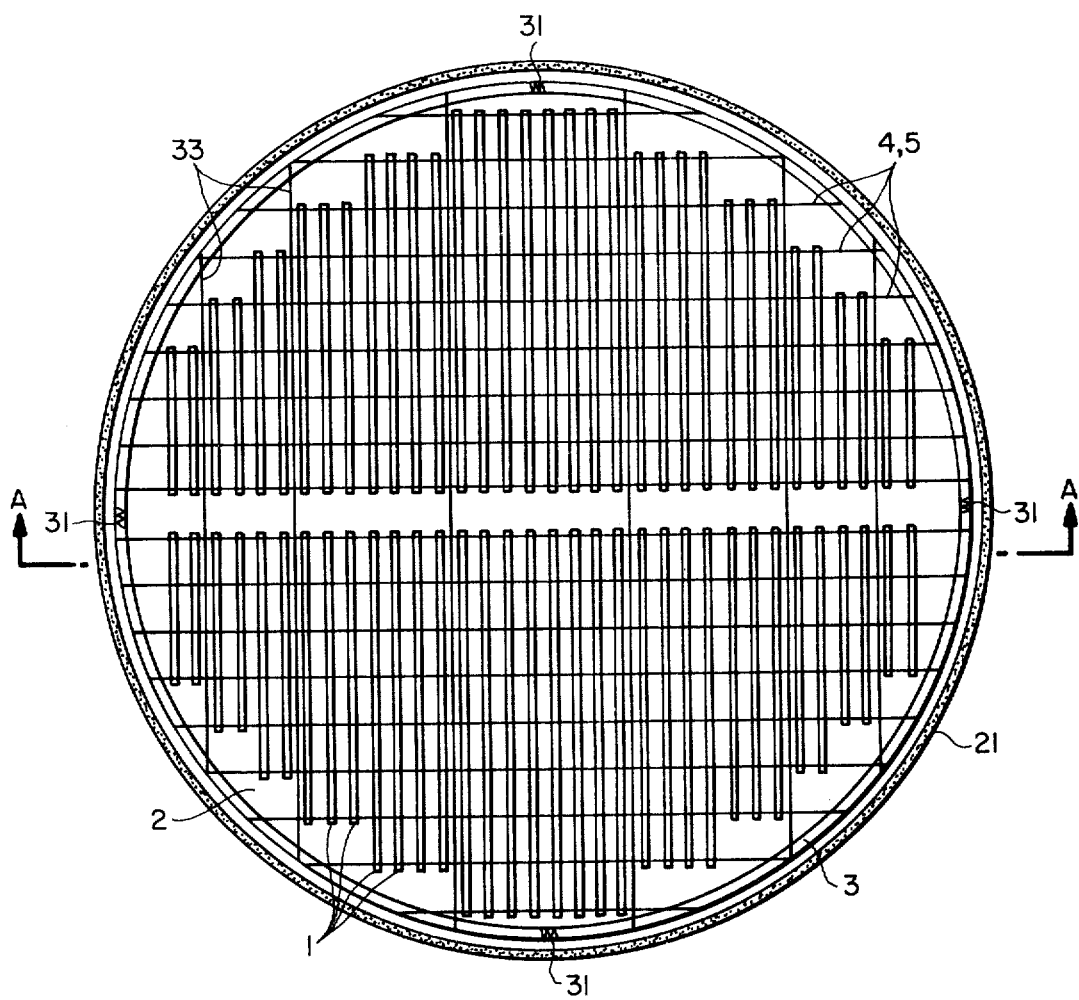
FIG__1
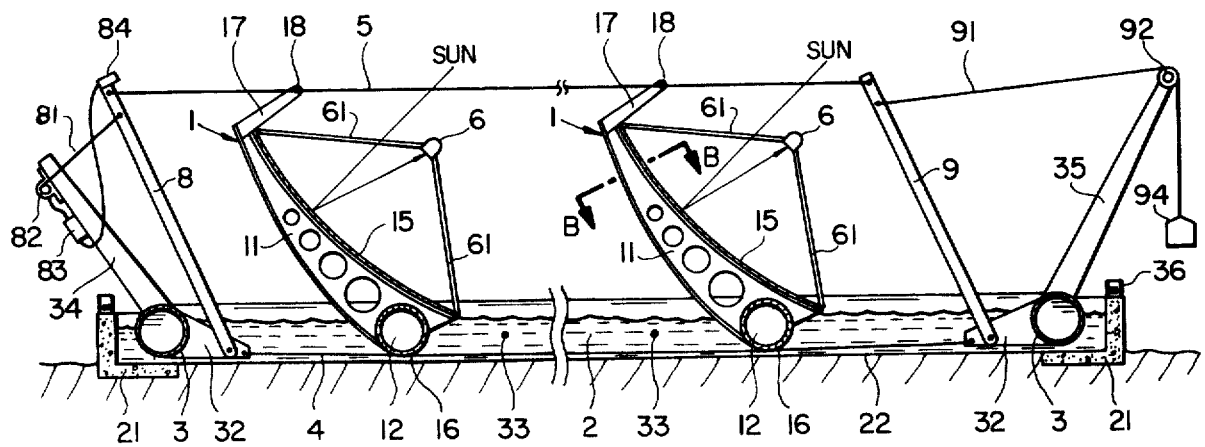
FIG__2

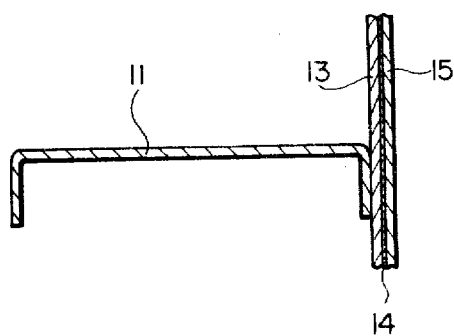
FIG_3
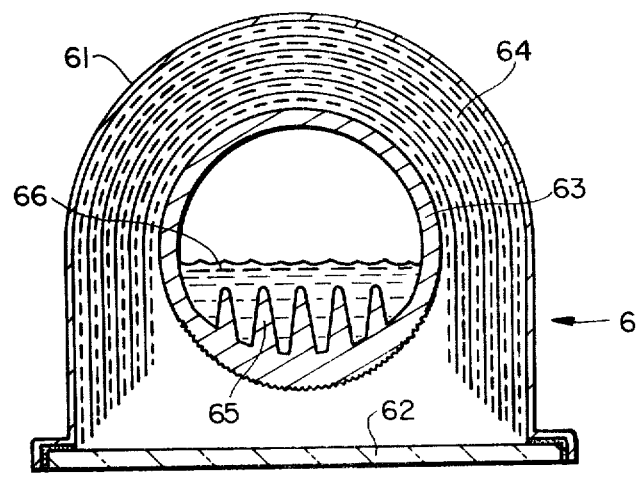
FIG_4
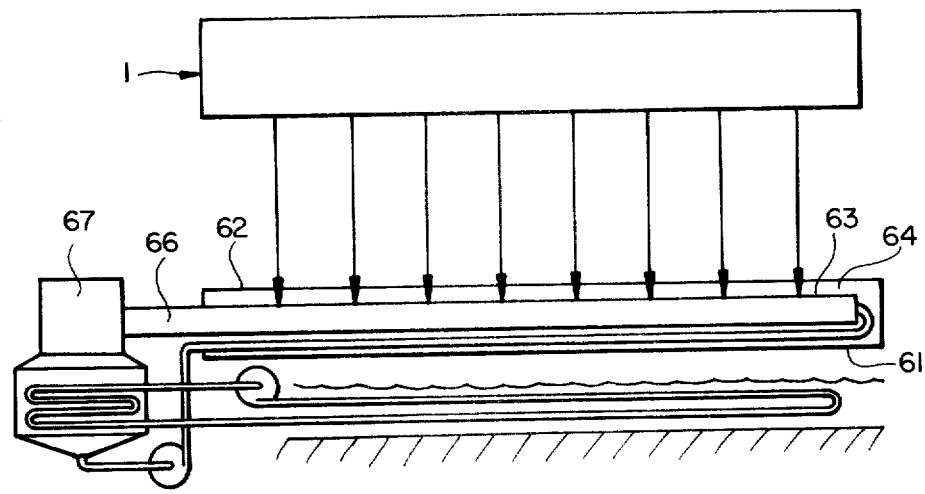
FIG_5

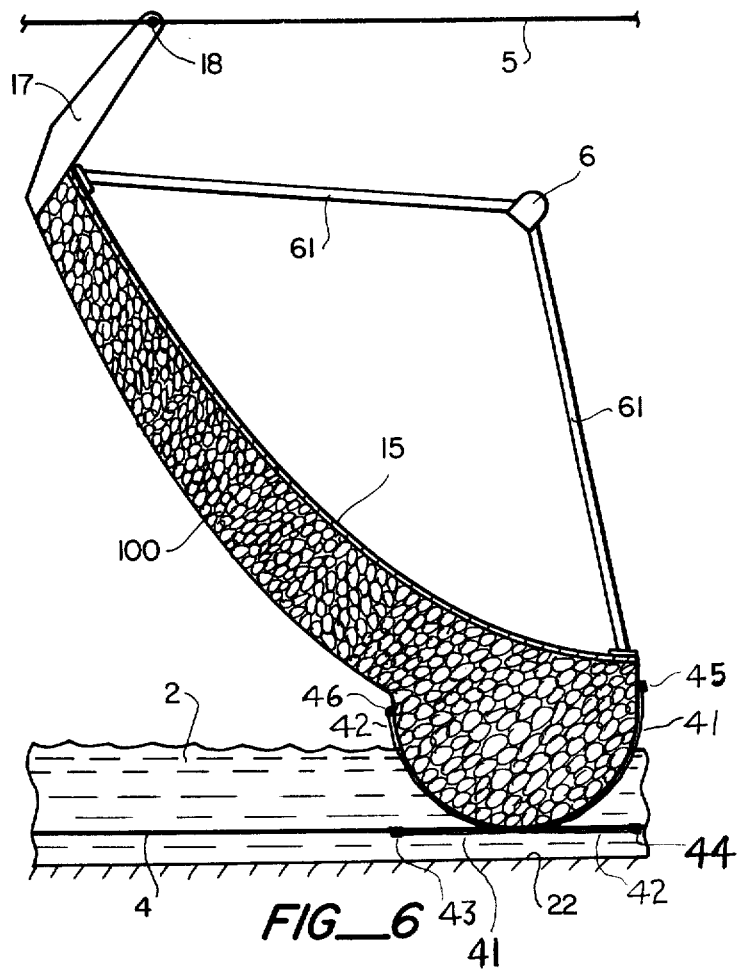
FIG_6
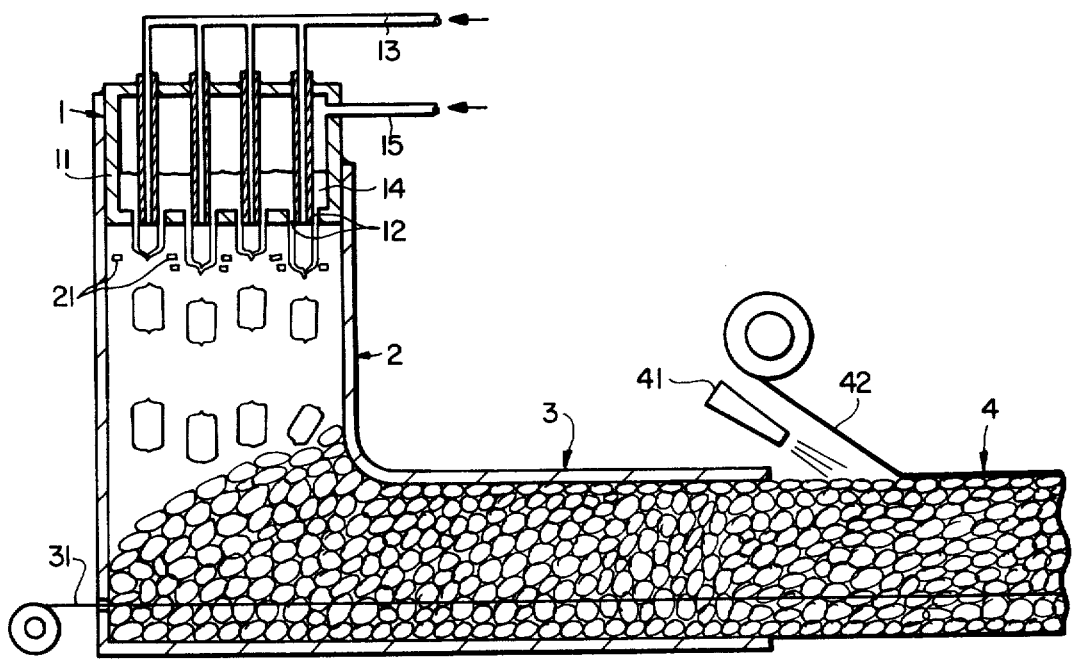
FIG_7

COLLECTION OF SOLAR ENERGY

BACKGROUND OF THE INVENTION

1. Field of the Invention

This invention relates to the collection of solar energy, and to apparatus suitable to effect such collection.

2. Summary of the Prior Art

Many devices have been used, or proposed for use, to collect solar energy. Some of these devices use reflectors which concentrate solar rays onto a reception device, for example an oven for cooking food, or a pipe through which water is pumped and in which steam is generated for a boiler. At present, however, the capital and operating costs of solar collection devices preclude their use for the large scale generation of energy. There is, therefore, an urgent need for improved devices for the collection of solar energy, and especially such devices which can be used to generate electricity on a large scale.

SUMMARY OF THE INVENTION

I have discovered a number of ways to significantly improve the cost/efficiency ratio of solar collection apparatus.

In its first aspect, the invention provides improved apparatus for collecting solar energy, which apparatus comprises (a) a pool of liquid;

(b) a frame buoyantly disposed on said pool of liquid;

(c) at least one solar collection device for collecting solar energy, said device being attached to said frame and preferably also buoyantly disposed on said pool of liquid; and (d) orientation means for orienting said frame to place said solar collection device in a desired position relative to the rays of the sun.

The frame and collection devices preferably float on the pool of liquid, supported solely by the buoyant forces, but the possibility of using additional supporting means for them is not excluded. The solar collection device generally comprises at least one reflector (preferably an elongate reflector having a reflecting surface of generally parabolic cross-section), in which case the device preferably also comprises an absorption device onto which the reflected rays are concentrated.

I have devised a novel absorption device which comprises (a) an outer elongate generally tubular member; and (b) an inner elongate generally tubular member which is within said outer member and preferably concentrically disposed therein, and which is separated therefrom by a layer of gas at sub-atmospheric pressure; said outer member preferably comprising at least one transparent longitudinally extending portion through which solar rays reflected by a reflector can enter to impinge upon said inner member, and said device preferably also comprising at least one longitudinally extending reflecting surface which substantially reduces re-radiation in the form of thermal energy of rays which have been absorbed by said inner member. Such an absorption device is useful for absorbing focused solar energy from any source (ie. not only in apparatus as defined above) and as such forms an independent aspect of the present invention.

I have also devised a novel constructional material which, although it is particularly useful for constructing the reflectors which are preferably used in the apparatus defined above, is also useful for many other purposes and therefore forms a further independent aspect of the present invention. In this aspect the invention provides a shaped article which comprises a plurality of hollow glass bodies which are connected together through randomly coalesced wall portions. The glass bodies preferably comprise closed cells, which may be filled with air or other gas. The invention further provides a method of making such a shaped article which comprises (a) forming a plurality of hollow bodies whose outer surfaces are composed of molten glass (b) assembling said hollow bodies into a desired shape;

(c) maintaining said bodies in said desired shape while wall portions thereof coalesce randomly; and (d) cooling the coalesced bodies to form said shaped article.

A preferred method comprises extruding molten glass through a plurality of annular orifices to produce a plurality of tubular extrudates; chopping said tubular extrudates into short lengths, preferably thereby sealing their ends; and collecting said short lengths of tubular extrudate in a mould while said short lengths are at a temperature at which wall portions thereof randomly coalesce to form a unitary body.

BRIEF DESCRIPTION OF THE DRAWINGS

The invention is illustrated in the accompanying drawings, in which

FIG. 1 is a plan view of preferred apparatus according to the invention;

FIG. 2 is partial cross-section on an enlarged scale along the line A—A of FIG. 1;

FIG. 3 is a cross-section on an enlarged scale along the B—B of FIG. 2;

FIG. 4 is a detailed cross-section of the absorption device shown in FIG. 2;

FIG. 5 is a diagrammatic representation of the system for passing water through the reception device and converting the superheated steam formed therein into electricity;

FIG. 6 is a cross-section through an alternative form of reflector;

FIG. 7 is a cross-section through apparatus for making a reflector as shown in FIG. 6:

DETAILED DESCRIPTION OF THE INVENTION

Referring now to FIGS. 1, 2 and 3, a plurality of horizontal elongate parallel reflectors 1 are buoyantly disposed on circular pool of water 2 within an enclosure formed by parapet 21 and waterproof base 22. The pool may be, for example, 100 to 10,000 feet in diameter and is preferably about 1 to 4 feet deep. The surface of the pool may be covered by a layer of very small hollow glass spheres or other means to reduce evaporation. The reflectors are connected to each other and to frame 3, which is in the form of a float beam of circular configuration and circular cross-section, though it could of course be of square or other cross-section, by a plurality of lower anchor cables 4 and upper control cables 5 at right angles to reflectors 1. The frame 3 floats on the pool 2 adjacent parapet 21 and has expansion joints 31 at appropriate intervals to compensate for thermal expansion and contraction.

Each reflector 1 comprises a plurality of ribs 11 which are secured to float beam 12 and to sheet steel member 13. The concave edge of the rib is in the shape of a parabolic curve, so that member 13 has a parabolic curved surface. Absorption device 6 is held by strut brackets 61 at the focal point of parabolic member 13. Attached to member 13 through adhesive layer 14 is parabolic reflecting surface 15. Float beam 12 is attached to brackets 32 of frame 3 by lower anchor cable 4 which is connected to the float beam in the general area designated 16 in such a manner that the beam can rotate through a desired angle, optionally with controlled movement in a horizontal plane, a suitable form of connection being shown in FIG. 6. Balancing cables 33 are secured to frame 3 and run at right angles to lower anchor cables 4, to preserve the circular configuration of frame 3. At the upper end of each reflector 1 is secured bracket 17. The bracket 17 is attached at swivel joint 18 to upper control cable 5, which is attached at each end to articulated beams 8, 9 which are rotationally secured to the brackets 32. Control cable 5 is maintained in tension between beams 8 and 9 by means of tensioning cables 81 and 91. Tensioning cable 91 passes freely over pulley 92 mounted on beam 35 secured to float beam 3 and weight 94 is attached to the end of tensioning cable 91. Tensioning cable 81 winds over motor-driven reel 82, mounted on beam 34 and electrically controlled by control device 83. Control device 83 changes the length of cable 81 in response to signals from photoelectric device 84 which is responsive to changes in the elevation of the sun. As the length of cable 81 changes, the angle to the horizontal of the reflecting surfaces 15 also changes so that they reflect the maximum amount of solar energy onto absorption device 6.

Equispaced azimuth drive units 36, typically three or more, mounted on parapet 21 rotate the frame 3 in response to signals from a photoelectric device (not shown) so that the reflecting surfaces 15 are maintained facing the sun.

The apparatus is preferably constructed so that during periods of inclement weather, such as high winds, hail and sandstorms, the reflectors can be rotated so that the reflecting surfaces are not exposed to the elements. The apparatus can also include sprinklers for washing the reflective surfaces of the reflectors.

FIG. 4 is a detailed cross-section of absorption device 6. Device 6 includes an opaque housing 61 and a window member 62 sealed thereto to form a vacuum-tight, elongate, generally tubular outer member. Window member 62 is made of a material which is transparent to solar rays and preferably relatively opaque to and reflective of thermal radiation. Such materials are known in the art. Inside the outer member is tubular, inner member 63 which is held in position by annular supports (not shown).

Alternate layers of glass cloth and reflective foil 64 lie between members 61 and 63. The free space between members 61 and 63 contains gas, eg. $CO_2$, at vacuum pressure. Inner member 63 is constructed of an absorptive material such as black iron. A small controlled flow of a working fluid 66, eg. water, passes through inner member 63 and absorbs heat therefrom. Inner member 63 is tubular and in the preferred embodiment shown, the portion thereof onto which the solar rays impinge is serrated on the outside and provided with internal fins 65 to assist heat transfer to working fluid 66. The heated working fluid is used to do work at the end of the tube, eg. to generate electricity as described below in connection with FIG. 5.

FIG. 5 shows diagrammatically how the heated working fluid 66 can be used to generate electricity. The heated fluid, eg. superheated steam, is used to drive a turbine 67 and is then condensed and recycled to the absorption device. It will usually be convenient to collect the steam from all the absorption devices (item 6 in FIG. 4) by means of a header pipe which delivers the collected steam to a central turbine.

FIG. 6 shows an alternative form of reflector for use in place of reflector 1 in FIG. 1. Ribs 11, float beam 12 and parabolic sheet steel member 13 are replaced by a monolithic body 100 which is of constant cross-section and which is composed of a plurality of hollow glass bodies which are connected together through randomly coalesced wall portions. Also shown in FIG. 6 is a method of connecting the reflector to the lower anchor cable 4, which method can also be used to connect anchor cable 4 to float beam 12 of reflector 1 in FIG. 2. Auxiliary cables 41 and 42 are attached to cable 4 at attach points 43 and 44 respectively and to the reflector at attach points 45 and 46 respectively. Movement of cable 4 thus causes the angle of the reflector to change. Attach points 43 and 44 could be placed further from the reflector than shown in the drawing to permit the reflector to be rotated to a position in which the reflecting surface 15 is protected from the elements.

FIG. 7 shows diagrammatically apparatus for making a reflector as shown in FIG. 6. The apparatus comprises extrusion section 1, chimney section 2, molding section 3, and coating section 4. The extrusion section 1 comprises closed hopper 11 having annular extrusion orifices 12 in the base thereof, and air is supplied to the centres of the extrusion orifices by pipes 13. The hopper contains molten glass 14 which is maintained at a constant level by feeding molten glass to the hopper from supply means (not shown). The molten glass in the hopper is maintained under pressure by compressed air supplied to the top of the hopper through pipe 15. The molten glass is extruded through orifices 12 to form tubular extrudates. In chimney section 2, chopper bars 21 cut the tubular extrudate into short lengths of hollow cross-section which fall through the chimney section to molding section 3, in which wall portions of the short hollow lengths coalesce randomly in a mold whose outlet cross-section is the same as the cross-section of monolithic body 100 shown in FIG. 6. As such coalescence takes place, reinforcing wires 31 are fed into the mass of hollow glass bodies. Pressure provided in chimney section 2 induces the mass of coalescing glass to move through the remainder of molding section 3, in which cooling is completed. As the molded body emerges from molding section 3 into coating section 4, adhesive is sprayed from nozzle 41 onto the surface of the molded body to which the reflective surfacing is to be applied, and the reflective surfacing 42 is applied to the adhesive-coated surface.

I claim:
1. Apparatus for collecting solar energy, which apparatus comprises
   (a) a pool of liquid;
   (b) a frame buoyantly disposed on and in contact with said pool of liquid;
   (c) a plurality of horizontal elongate parallel solar collection devices for collecting solar energy, said devices being attached to said frame and each said device comprising (i) an elongate horizontal reflec- tor body which is buoyantly disposed on and in contact with said pool of liquid and which has a reflecting surface of generally parabolic cross-section and (ii) an elongate horizontal absorption device at the focal point of said parabolic reflecting surface;

(d) azimuthal rotation means for rotating said frame to place said solar collection devices in a desired position relative to the sun; and (e) elevational rotation means for rotating each said horizontal reflector body about its longitudinal axis to place said solar collection devices in a desired position relative to the sun wherein each said reflector body comprises a plurality of hollow glass bodies which are connected together through randomly coalesced wall portions.

2. Application according to claim 1 wherein said liquid is an aqueous liquid.

3. Apparatus according to claim 1 wherein said frame comprises a hollow beam of generally circular configuration.

4. Apparatus according to claim 1 wherein each said reflector body has been produced by a process which comprises (i) extruding molten glass through a plurality of annular orifices to produce a plurality of tubular extrudates;

(ii) chopping said tubular extrudates into short lengths thereby sealing their ends;

(iii) collecting said short lengths of tubular extrudate in a mold while said short lengths are at a temperature at which wall portions thereof coalesce;

(iv) maintaining said short lengths in said mold while wall portions thereof coalesce randomly; and (v) cooling the randomly coalesced short lengths to form said reflector body.

5. Apparatus according to claim 1 wherein said elevational rotation means can also be used to rotate said reflector bodies so that said reflecting surfaces are not exposed to the elements.

6. Apparatus according to claim 1 wherein said absorption device comprises (a) an outer elongate generally tubular member; and (b) an inner elongate generally tubular member which is within said outer member and is separated therefrom by a gas at subatmospheric pressure.

7. Apparatus according to claim 6 wherein said outer member comprises at least one transparent longitudinally extending portion through which solar rays reflected by said reflector can enter to impinge upon said inner member and wherein said absorption device also comprises at least one longitudinally extending reflecting surface which substantially reduces re-radiation in the form of thermal energy of rays which have been absorbed by said inner member.

8. Apparatus according to claim 7 which comprises means for passing a working fluid through said inner member.

9. Apparatus according to claim 8 which comprises means for generating electricity from working fluid at elevated temperature and pressure which issues from said inner member.

10. Apparatus according to claim 1 wherein said azimuthal rotation means is responsive to the azimuthal direction of the sun and said elevational rotation means is responsive to the elevation of the sun.

11. Apparatus according to claim 10 wherein said elevational rotation means is coupled to each of said elongate reflector bodies.

* * * * *